United States Patent [19]

Hile et al.

[11] Patent Number: 4,750,545
[45] Date of Patent: Jun. 14, 1988

[54] HUMIDITY AND TEMPERATURE CONTROL SYSTEM

[75] Inventors: John R. Hile, Black Mountain; W. Ross Hile, Ridgecrest, both of N.C.

[73] Assignee: Parameter Generation & Control, Inc., Black Mountain, N.C.

[21] Appl. No.: 942,767

[22] Filed: Dec. 17, 1986

[51] Int. Cl.$^4$ .............................. F24F 3/14; B01F 3/02; G05D 21/00
[52] U.S. Cl. ........................................ 165/20; 165/60; 236/44 B; 236/44 C; 62/176.4
[58] Field of Search ................. 165/3, 20, 21, 60; 236/44 B, 44 C; 62/176.4

[56] References Cited

U.S. PATENT DOCUMENTS

| | | | |
|---|---|---|---|
| 2,044,352 | 6/1936 | Evans | 62/176.4 |
| 2,309,165 | 1/1943 | Candor | 165/20 |
| 2,343,467 | 3/1944 | McGrath | 165/20 |
| 2,419,119 | 4/1947 | Christensen | 165/3 |
| 2,545,491 | 3/1951 | Ohlheiser | 165/20 |
| 3,651,864 | 3/1972 | Maddox, Jr. | 165/20 |
| 4,574,062 | 3/1986 | Weitman | 165/3 |
| 4,627,568 | 12/1986 | Lortie et al. | 236/44 B |
| 4,662,560 | 5/1987 | Norris et al. | 236/44 B |

FOREIGN PATENT DOCUMENTS 2076958 12/1981 United Kingdom ................. 165/21

Primary Examiner—Albert W. Davis, Jr.
Assistant Examiner—John K. Ford
Attorney, Agent, or Firm—Brady, O'Boyle & Gates

[57] ABSTRACT

An integrated precision humidity and temperature control system of research laboratory quality is disclosed in which air flow, water spray and refrigeration apparatuses are sequenced automatically by solid state controls linked in a cooperative manner. Very stable and precise relative humidity and control air temperature constancies are maintainable.

8 Claims, 1 Drawing Sheet

HUMIDITY AND TEMPERATURE CONTROL SYSTEM

BACKGROUND OF THE INVENTION

1. Technical Field:

The present invention relates broadly to an air conditioning system to enable technical research and processing of materials under very strict humidity and temperature control parameters.

2. The Prior Art:

U.S. Pat. No. 2,545,491 discloses an air conditioning system for precisely controlling the temperature and humidity of air. The patented system essentially is a dual temperature generator which, in one mode, maintains a water spray temperature very close to the dewpoint, which acts as a humidifier or dehumidifier depending on the vapor pressure of the air presented to the spray and, in the second mode, controls the dry-bulb temperature of a chamber or room by reheating the air from the spray, as required.

One drawback of the patented system is the consumption of substantial amounts of energy in the form of reheat power.

Another drawback of the patented system is its inability to smoothly modulate the refrigeration capacity of the system over a sufficiently wide range.

Still another drawback of the prior art system is its inability to automatically change the water spray temperature set point in minute increments in response to demands for precise relative humidity control under experimental laboratory conditions.

It is the general objective of the present invention to eliminate the above drawbacks of the prior art by providing a precision relative humidity control means operating in sequence with air conditioning equipment to effect an extremely stable relative humidity control.

More particularly, in the present invention, the system possesses the ability to automatically change the water spray temperature set point in increments of 0.1° C. responsive to demands for relative humidity control.

The present invention embodies a unique air temperature control system requiring as little as 1/10th the reheat power of the prior art dual temperature generator.

The invention further includes a precision refrigeration control system which allows smooth modulation of refrigeration capacity in the system over a range of 0–100%, in response to a water temperature controller, effecting a ±0.1° C. temperature control at a spray header. Heretofore, large research laboratory areas (over 400 square feet) have been very difficult to control within close relative humidity tolerances. By means of the present invention, single point relative humidity constancies to ±1.0%, as well as control air temperature constancies to ±0.4° C. in areas up to 3000 square feet, are routinely attainable.

Other objects and advantages of the invention will become apparent to those skilled in the art during the course of the following description.

DETAILED DESCRIPTION

Figure 1:
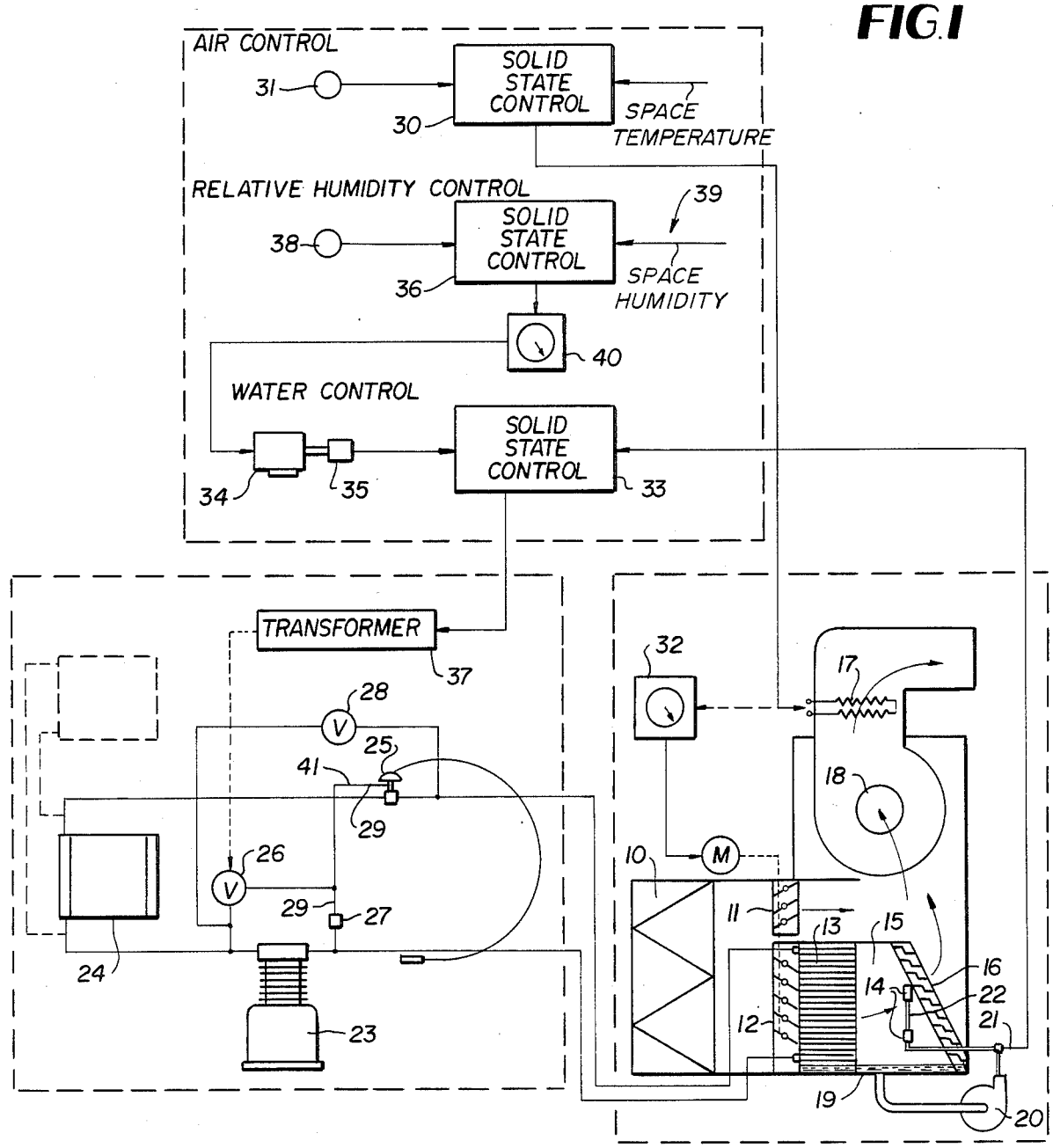
FIG. 1 is a schematic view of a humidity and temperature control system according to the present invention.

Referring to FIG. 1 of the drawings, wherein like numerals designate like parts, air returning from conditioned spaces passes through a filter 10 and then through a by-pass damper 11, or coil face damper 12, or a combination of such dampers. The positioning of the dampers 11 and 12 is effected by a unique air temperature controller, which will be described in greater detail hereinafter. Basically, as more cooling is required, more air passes through the damper 12 and over a sprayed evaporator coil 13.

The air leaving the sprayed coil 13 passes through a very fine water spray whose temperature at the nozzles 14 is controlled to within ±0.1° C. by the water spray temperature controller to be described hereinafter. After leaving the spray area 15, the air passes through a mechanical mist eliminator 16, rejoining the by-passed air as indicated by the directional arrows in FIG. 1.

The air then passes over a heating device 17, which can be electrical, a refrigerant hot gas coil, steam, or direct combustion, depending on the unit size. The air passes through a fan 18 which may be upstream from the heating device, as illustrated, or downstream therefrom, in some cases.

Water from a sump 19 is circulated by a centrifugal pump 20 over a platinum resistance temperature detector (RTD) 21 and into a spray header 22. After leaving the spray area 15, the water is cooled as it contacts the sprayed coil 13. The flow and character of the refrigerant admitted to the sprayed evaporator coil 13 is controlled by a series of valves, yet to be described.

The refrigeration system consists of a standard refrigeration compressor 23, air or water cooled condenser 24, and the evaporator coil 13. In some applications of the invention, the refrigerant can be used to cool an intermediate solution such as ethylene glycol, which would then be circulated through the sprayed coil 13.

The refrigerant flow pattern is determined by four control valves, namely, an expansion valve 25, hot gas by-pass valve 26, hand valve, orifice or capillary 27, and a suction pressure control valve 28. The refrigeration expansion valve 25 modulates in response to the evaporator coil outlet temperature and the pressure at point 29, which is determined by the position of the valve 26, valve 27, and compressor suction pressure. The hot gas by-pass valve 26 is modulated by the output of the water spray temperature controller. The setting of hand valve 27 (or capillary size) is determined according to capacity and response requirements. The suction pressure control 28 modulates in order to maintain a minimum compressor suction pressure and evaporator temperature. The operation of these several valves will be further described.

Figure 2:
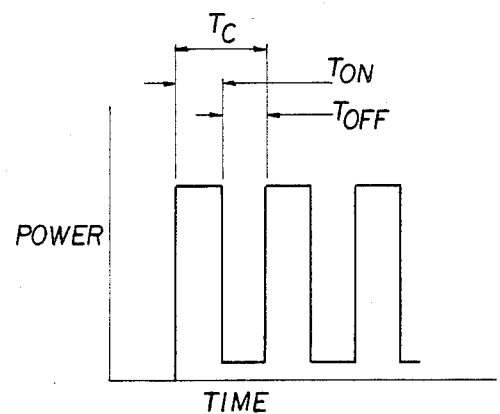
FIG. 2 is a time and power chart of controller output.

FIG. 1 depicts air, relative humidity and water control sequences. In the air control sequence, a solid state proportioning control system 30 compares the resistance of a platinum RTD sensing the space temperature to the resistance of a 10-turn potentiometer 31. The normal "on-control" output would be 50% on a time basis, as shown in FIG. 2. The normal output of the air temperature controller 30 is line voltage of an amperage commensurate with heater 17 being controlled on a proportional time basis; i.e., when the controller 30 is calling for full heat, the line voltage will be applied to heater 17 on a continuous basis and when the controller is not calling for heat, no voltage is applied to the heater 17. When the set point temperature equals the space temperature, the controller 30 duty cycle output is 50% (on-time equals off-time as illustrated in FIG. 2). If the time cycle of the controller 30 was adjusted for a four second period and the controller required 25% of the heating capability of the unit, it would apply line voltage to the heater 17 for one second and remove this power for three seconds. In like manner, if it required 50% heat, it would apply power for two seconds and remove the power for two seconds. This time cycle is depicted as $T_c$ in FIG. 2. The above times are for the purpose of description only and in reality the time cycle is adjustable from two seconds to twenty seconds. Heater 17 is pulsed on a continuous basis. This line voltage pulse to heater 17 is also applied to a timer circuit 32 which opens a window equal to $T_c$ (or an integer multiple of $T_c$) every ten minutes (adjustable). The timer circuit 32 allows the line voltage output of the temperature controller 30 to be applied to damper drive motor M for four, eight, or twelve seconds every ten minutes. The timer circuit is designed in such a manner that during the time the power is applied to the heater, the damper motor M drives the coil by-pass damper 11 further open an the coil face damper 12 further closed effectively providing less cooling to the overall airstream. During the time that power is not applied to the heater, the damper motor M drives the coil by-pass damper 11 incrementally to the closed direction and the coil face damper 12 to the open direction providing more cooling to the overall airstream. If the on-time equals the off-time, the face damper 12 and by-pass damper 11 positions are unaffected. If the air temperature controller is calling for more heat, i.e., on-time is greater than off-time, the damper 11 will be adjusted slightly to by-pass more air so that less reheat will be required. In like manner, a call for less than 50% heat will cause the damper 11 to move in the opposite direction passing more air through the sprayed evaporator coil 13, and raising the amount of reheat required.

Another solid state proportional controller 33, similar to the controller 30, is adjusted by an electro-mechanical servo motor 34 and potentiometer 35. The positioning of this potentiometer 35 is determined by a relative humidity controller 36, to be further discussed. The feedback to the controller 33 is the platinum RTD 21 in the water line. The output of the controller 33 is a time proportional power signal which adjusts the refrigeration by-pass valve 26 after passing through a transformer 37.

The solid state proportional relative humidity controller 36 is also adjusted by a manual 10-turn potentiometer 38 to the desired relative humidity with a resolution of 0.1%. The feedback to this controller 36 is from a relative humidity transducer 39 measuring the space humidity which generates a 0–5 volt DC signal proportional, to the desired relative humidity range. The normal output would be 50% on a time basis, FIG. 2. This pulse is applied to a timer circuit 40 which opens a window equal to $T_c$ (or some integer multiple of $T_c$) every ten minutes (adjustable ) as described above in the air temperature control sequence. If the output is 50%, i.e., time-on equals time-off, the servo potentiometer 34–35 position is unchanged. However, if the relative humidity has dropped as much as 0.2% (dependent on the sensitivity of the transducer 39), the time-on will be greater than the time-off and the servo means 34–35 will be adjusted to raise the water temperature command by approximately 0.1° C., thus raising the relative humidity to the desired set point.

For full refrigeration in the system to prevail, the water spray temperature controller 33 would be calling for full cooling, i.e., no electrical output would be applied to the hot gas by-pass valve 26, causing it to close. With this valve closed, the refrigeration system operates at 100% capacity.

For no refrigeration to exist in the system, the controller 33 would be calling for no cooling, i.e., full electrical output signal to the valve 26, causing the valve to open fully, admitting a small amount of hot gas to point 29, pressurizing that portion of the equalizer line 41 between the expansion valve 25 and the hand valve or capillary 27. This elevated pressure causes the expansion valve 25 to close completely, eliminating all refrigeration effect. The suction pressure control valve 28 would be opened as required to maintain a safe suction pressure at the compressor 23 causing some heating within the coil 13 from the hot gas by-pass.

Normal refrigeration will prevail in the system at some modulated position of the above valves to satisfy the water spray temperature controller 33.

It may be seen that an integrated humidity and temperature control syetem is provided in which the air flow, water spray, and refrigeration sequences are precision controlled automatically, with the result that an extremely stable relative humidity constancy of $\pm 1.0\%$ can be maintained as well as control air temperature constancy of $\pm 0.4°$ C. in areas up to 3000 square feet.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. An air conditioning system particularly for a testing laboratory environment comprising:
   an air handler for receiving air returning from a conditioned space and delivering the air back to the space after conditioning the air, the air handler including a filter for air entering the air handler, an evaporator coil downstream from the filter, the air flowing through said filter passing through said evaporator coil, an air by-pass portion adjacent said evaporator coil, whereby the air flowing through said filter is adapted to by-pass the evaporator coil, a first adjustable damper between the filter and the evaporator coil, a second adjustable damper mounted in said by-pass portion, a drive motor operatively connected to said adjustable dampers, a means to spray water on the evaporator coil and an air heater downstream from the evaporator coil, and
   a refrigeration apparatus located remotely from said evaporator coil and being operatively connected therewith, said refrigeration apparatus including a compressor, condenser and refrigerant flow control valve means including a hot gas by-pass valve having an electrical actuator, and
   a controller for the air conditioning system including an air temperature control device having an electrical pulsed output connected to the air heater and damper drive motor, a potentiometer connected to said air temperature control device and adapted to be set to the desired space temperature, space temperature sensing means connected to said air temperature control device, a timer circuit means electrically connected between said damper drive motor and said air temperature control device, wherein during the time power is applied to the heater, the damper drive motor responsive to said timer circuit means periodically moves the second adjustable damper toward an open position while simultaneously moving the first adjustable damper toward a closed position, to thereby provide less cooling to the returning air stream, and during the time that power is not applied to the heater the damper drive motor responsive to said timer circuit means periodically moves the second damper toward a closed position while simultaneously moving the first damper toward an open position, to thereby provide more cooling to the returning air stream;

a water control device having a pulsed output connected to the hot gas by-pass valve actuator, said water control device being electrically connected to a water temperature sensing means in the air handler and receiving an input therefrom; and a relative humidity control device having a pulsed output and including a potentiometer adapted to be set to the desired relative humidity of the space, space relative humidity sensing means connected to said relative humidity control device, a second timer circuit means electrically connected to the output of said relative humidity control device and water temperature set point adjustment means connected between said second timer circuit means and said water control device, wherein the pulsed output resets the water temperature control set point periodically through the second timer circuit means.

2. An air conditioning system particularly for testing laboratory environment as defined in claim 1, and said refrigerant flow control valve means further including expansion and adjustable orifice valves connected between said compressor and evaporator coil and each having a connection with said hot gas by-pass valve.

3. An air conditioning system particularly for testing laboratory environment as defined in claim 2, and said control valve means further including a suction pressure control valve in the refrigeration apparatus connected between the compressor and hot gas by-pass valve and between the expansion valve and the evaporator coil, whereby the refrigeration capacity of the system may be smoothly modulated over a range of 0–100% in response to the water temperature controller, effecting ±0.1° C. temperature control at a spray header.

4. An air conditioning system particularly for testing laboratory environment as defined in claim 1, and the electrical actuator including a transformer connected between said water control device and hot gas by-pass valve.

5. An air conditioning system particularly for testing laboratory environment as defined in claim 1, and said water temperature sensing means comprising a resistance temperature detector on the water spray means.

6. An air conditioning system particularly for testing laboratory environment as defined in claim 1, and said air handler further including a mist eliminator means positioned between the water spray means and air heater, a water sump, and a water pump connected between said sump and water spray means and being operable to circulate water over said water temperature sensing means element.

7. An air conditioning system particularly for testing laboratory environment as defined in claim 1, and said air heater comprising a heating element and a fan to circulate air.

8. An air conditioning system for a testing laboratory comprising:

an air handler for receiving air returning from a conditioned space and delivering the air back to the space after conditioning the air, the air handler including an evaporator coil through which air entering the handler flows, an air by-pass portion adjacent said evaporator coil, adjustable damper means positioned in said by-pass portion and adjacent to the evaporator coil face, air circulating and heating means downstream from said damper means, drive means operatively connected to said adjustable damper means, whereby the amount of air flowing through the by-pass portion and evaporator coil may be controlled, means for directing a spray of water onto the evaporator coil including water temperature sensing means;

a refrigeration apparatus operatively connected to said evaporator coil and including refrigerant flow control valves;

a controller for the air conditioning system including air temperature control means electrically connected to the heating means and damper drive means, water spray temperature control means operatively connected to one of said refrigerant flow control valves and to said water temperature sensing means; and relative humidity control means having a pulsed output and including a potentiometer adapted to be set to the desired relative humidity of the space, space relative humidity sensing means connected to said relative humidity control means, a timer circuit means electrically connected to the output of said relative humidity control means, and water temperature set point adjustment means connected between said timer circuit means and said water spray temperature control means, wherein the pulsed output resets the water temperature control set point through the timer circuit means periodically, whereby the water spray temperature set point may be changed in increments of 0.1° C. in response to the demand of the relative humidity control means, thereby cascading the output of the relative humidity control means to adjust the water spray temperature set point as required.

* * * * *